United States Patent
Anderson et al.

(10) Patent No.: US 6,973,569 B1
(45) Date of Patent: Dec. 6, 2005

(54) INEXPENSIVE SECURE ON-LINE CERTIFICATION AUTHORITY SYSTEM AND METHOD

(75) Inventors: Anne H. Anderson, Acton, MA (US); Stephen R. Hanna, Bedford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1026 days.

(21) Appl. No.: 09/608,264

(22) Filed: Jun. 30, 2000

(51) Int. Cl.[7] ............................................. H04L 9/00
(52) U.S. Cl. ...................... 713/156; 713/200
(58) Field of Search ........................................ 713/156

(56) References Cited

U.S. PATENT DOCUMENTS

| | | | | |
|---|---|---|---|---|
| 4,529,870 A | * | 7/1985 | Chaum | 235/380 |
| 5,826,012 A | * | 10/1998 | Lettvin | 713/200 |
| 5,922,074 A | * | 7/1999 | Richard et al. | 713/200 |
| 6,308,266 B1 | * | 10/2001 | Freeman | 713/156 |
| 6,308,277 B1 | | 10/2001 | Vaeth et al. | 713/201 |
| 6,490,367 B1 | * | 12/2002 | Carlsson et al. | 382/137 |

OTHER PUBLICATIONS

"Boot Disk Recovery" http://www.measureup.com/testobjects/MS_NT4W/5a8cbb2.htm; Apr. 21, 1998.*

* cited by examiner

Primary Examiner—Gregory Morse
Assistant Examiner—Christopher J. Brown
(74) Attorney, Agent, or Firm—Kudirka & Jobse, LLP

(57) ABSTRACT

A certification authority generates certificates in response to respective certification requests. The certification authority generally includes a computer that is bootable from a removable medium and a removable medium. The removable medium includes a machine readable medium having encoded thereon an operating system module configured to enable the computer to boot from the removable medium and a certificate generation module configured to, after the computer has been booted, control the computer to facilitate the generation of at least one certificate in response to an associated certificate request, the certification authority module being configured to provide that the computer not be remotely controlled during a certificate generation session.

16 Claims, 6 Drawing Sheets

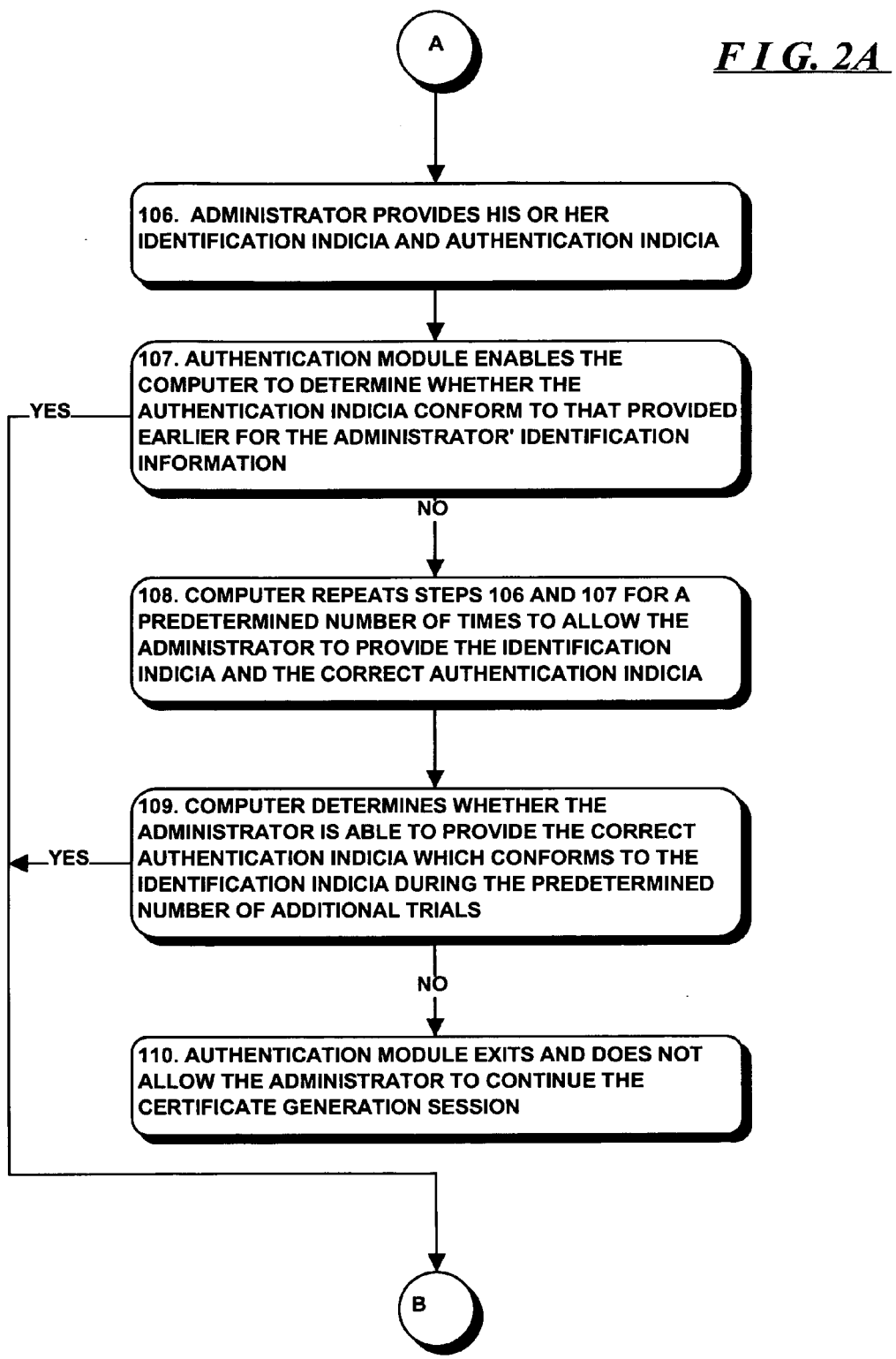

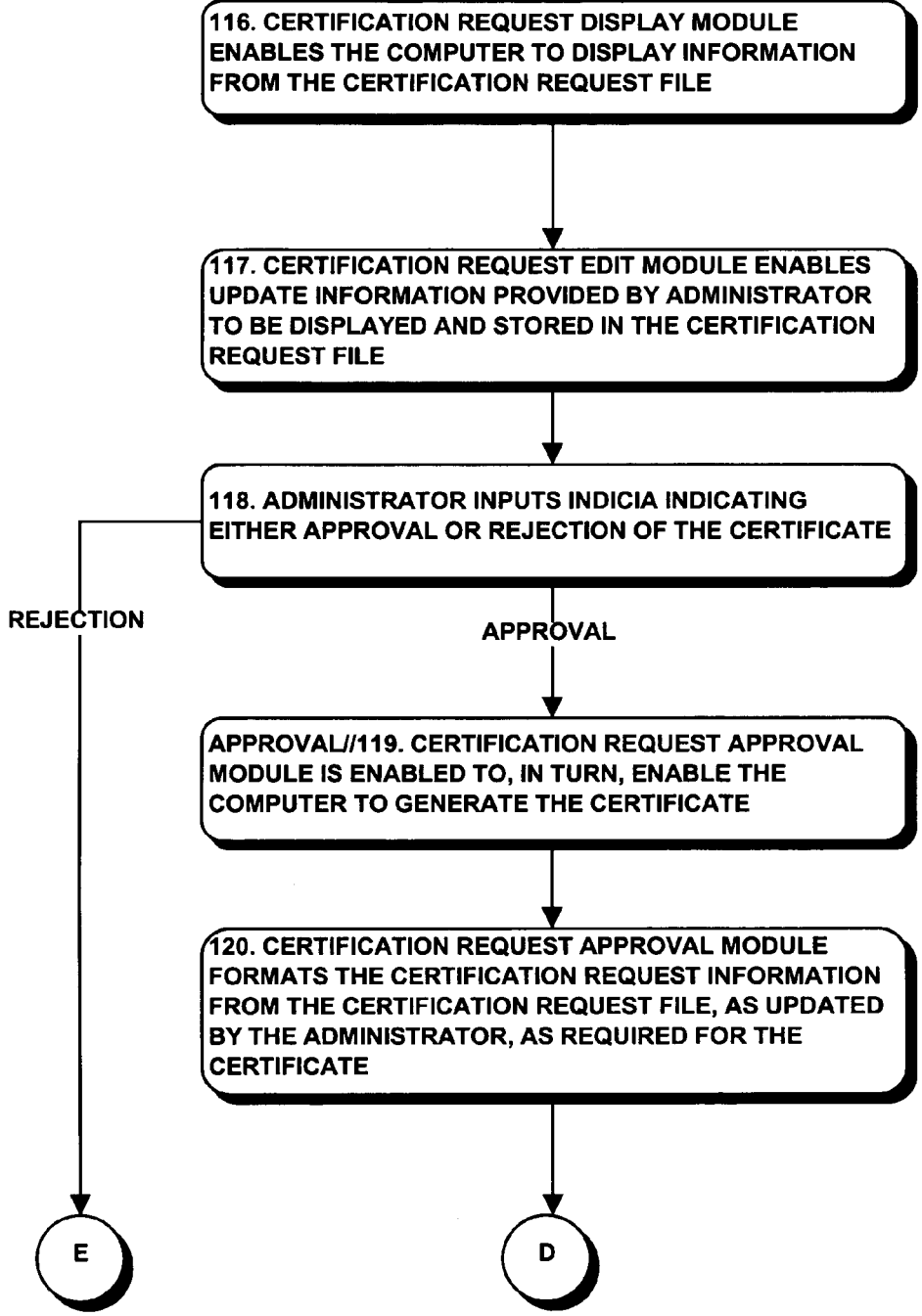

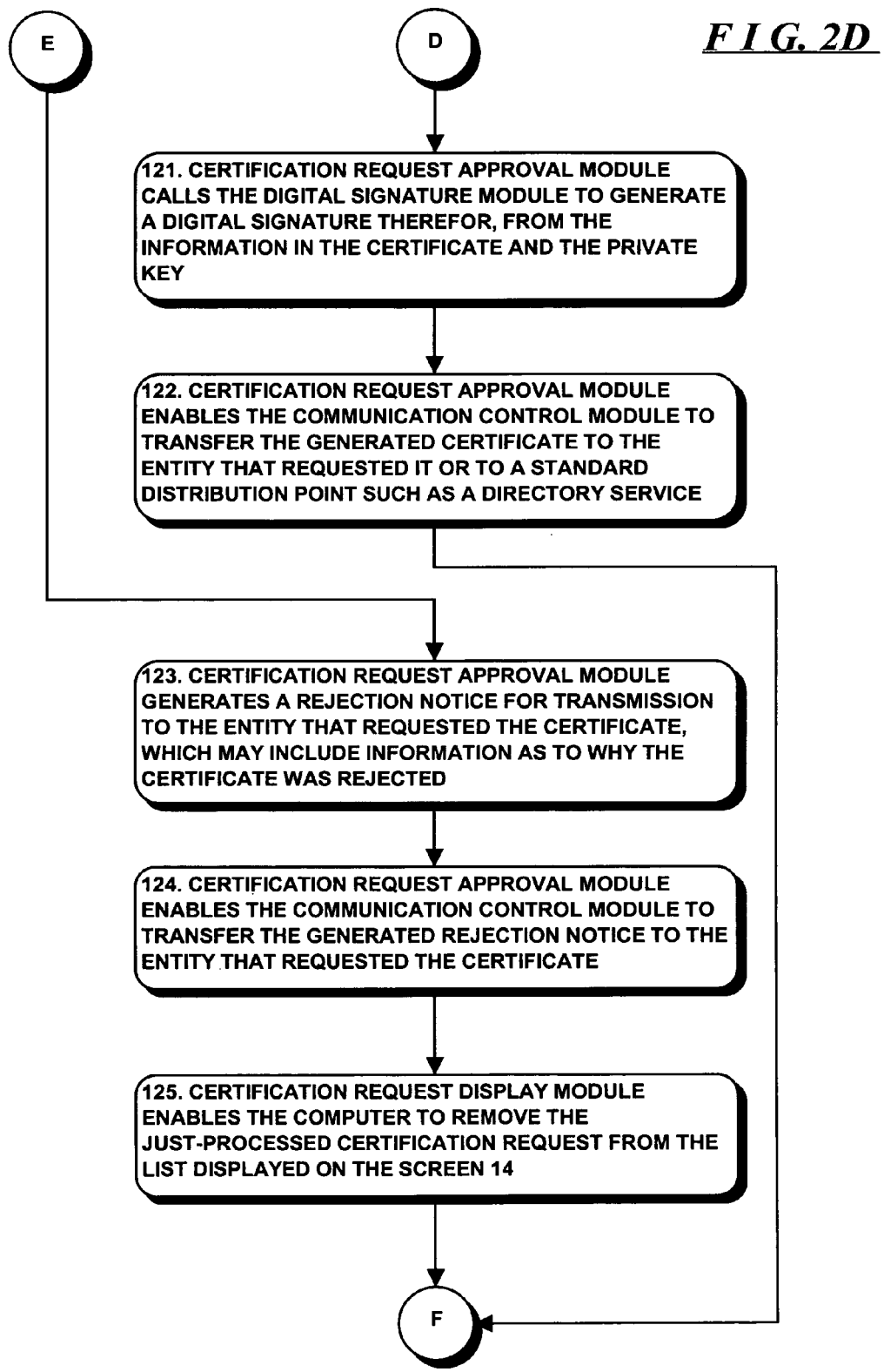

INEXPENSIVE SECURE ON-LINE CERTIFICATION AUTHORITY SYSTEM AND METHOD

FIELD OF THE INVENTION

The invention relates generally to the field of digital data processing systems, and more particularly to arrangements for facilitating regulation of resource usage in distributed computing environments. The invention particularly provides an inexpensive certificate-based authentication arrangement for a distributed computing environment in which authentication certificates provided with requests to access resources provided by servers in the distributed computing environment include resource utilization permission information obtained from privilege certificates provided by the respective servers or by privilege certificate issuing authorities on behalf of the respective servers.

BACKGROUND OF THE INVENTION

In a distributed computing environment, a number of computer systems are interconnected by networks. In a distributed computing environment that is organized according to the conventional "client-server" paradigm, computers, as client computers, can make use of computing resources, such as applications, information files and so forth, which are provided by other computers and other components which can provide resources and other services as server. In such an environment, computers may be exclusively client computers or exclusively server computers. Alternatively or in addition, computers may operate as both client computers and server computers, operating as a client computer when it requests access to a resource provided by another computer, and as a server computer in response to resource access requests from another computer.

A significant problem arising in connection with a distributed computing environment is how to regulate access to resources provided therein. Typically, security administrators make use of access control lists (so-called "ACL's") or similar devices to control access to resources provided by their respective systems. In an access control list-based system, the access control list identifies the particular resources that are available for use by an operator, on an operator-by-operator basis. In addition, the access control list can also identify limitations, if any, which have been placed on each particular operator's use of the resources which he or she has been authorized to use. When an operator, operating a client computer, wishes to make use of a resource that is provided by a system, the client computer will provide an identification for the operator and the particular resource or resources on the system that are to be accessed. If the system's access control list indicates that the operator has the appropriate "permissions," that is, if the access control list indicates that he or she is authorized to make use of the requested resource(s) for the purposes requested, the system will allow the resource(s) to be used in connection with the request. On the other hand, if the access control list indicates that the operator is not authorized to make use of the requested resource(s) for the purposes requested, the system will not allow the resource(s) to be used in connection with the request.

Several problems arise in connection with use access control lists and other mechanisms for regulating access to resources. One problem is to verify that an operator, who is requesting access to use a resource is, in fact, who he or she says he or she is, thereby to "authenticate" the operator's identity. The severity of this problem, and measures taken to address it, may vary depending on the particular resource that is to be accessed. For example, if an operator is requesting access to information that is publicly available on the server, such as World Wide Web pages that a server is making publicly available over the Internet, verification of the identification of the operator requesting access to the Web page may not be a problem. However, if an operator is requesting access to information from a server that is confidential to the particular enterprise maintaining the server, the system would need to verify not only that the operator has permission to access the information, but also that the operator is who he or she says he or she is.

One way this problem has been addressed is through use of passwords. In a password-based authentication system, the operator provides not only his name or other identifier, which may be publicly known, but also a password, which would be known only to the operator and the system whose resource(s) is/are to be used. If the password provided to the system along with an access request match the password known to the system for the operator identified by the identifier also provided with the access request, then the system would assume that the operator's identity has been authenticated and, if the access control list indicates that the operator can use the requested resource, allow access to the requested resource. On the other hand, if the password does not match the password known to the system for the operator identified by the identifier, the system will assume that the operator's identity has not been authenticated, and may refuse to allow access to the requested resource.

Several problems arise with the use of passwords to authenticate operators. First, in order for passwords to be useful, they need to be secure. However, if an operator does not treat his or her password as secure, that is, if he or she allows others access to his or her password, the security of the password will be compromised. Accordingly, a number of systems require operators to change their passwords frequently. This can create a problem particularly if an operator wishes to access resources on a number of systems, since the operator will need to keep his or her password up-to-date on each of the systems.

To avoid the problem of having to update passwords, authentication arrangements have been developed that issue authentication "certificates" for operators who may wish to access resources in a distributed arrangement. A certificate provides identifying indicia which a system can use to authenticate the identification of an operator requesting access to a resource provided by the system. The certificate is issued by a certification authority. A certification authority may be affiliated with systems that provide resources that may be accessed, or they may be third-party entities that vouch for the identity of the operators to whom they issue certificates. In a certificate-based system, the system would rely on the authentication provided by the certification authority and the operator need not be previously-identified to the system, which would be necessary in, for example, a password-based system. This would alleviate the problems noted above in connection with password-based systems, since the operator need not update password information periodically on all of the systems whose resources may be accessed.

Generally, a certificate includes identification information for the entity that is identified by the certificate, that is, the person or organization that the certificate is supposed to identify, identification information for the certification authority, an algorithm identifier and public key for the certification authority and an encrypted digital signature.

The certification authority uses a hash algorithm, identified by the algorithm identifier, to generate a message digest from the contents of the certificate, and uses its private key of its public key/private key pair to encrypt the message digest, resulting in a digital signature. When the certificate is to be verified, which may occur, for example, when it is to be used to verify that an operator is authorized to use a resource provided by a system, the system uses the same hash algorithm to generate a mesage digest, resulting in a digital signature. In addition, the system uses the certification authority's public key to decrypt the digital signature. If the message digest value generated corresponds to the decrypted digital signature, it can determine that the certificate is authentic. In that case, it can determine that the operator is the entity identified in the certificate. In addition, the system can determine that the key in the certificate is that entity's public key, which can be used to encrypt information to be sent to the entity.

Since the certification authority uses its private key in generating the signature that is included in the certificate, it is important that the private key remain secure. If the private key is revealed to an unauthorized entity, the unauthorized entity may be able to issue counterfeit certificates that a system may recognize as authentic. A number of strategies are used by a certification authority to maintain security. A certification authority includes a computer that stores the private key and is programmed to generate a certificate on a medium that is readable by a computer or other digital device. The computer is typically maintained in both a physically isolated and electronically isolated condition. That is, the computer is physically isolated, typically in a securely locked room, so that it may be physically accessed only by an administrator who is trusted and authorized to generate certificates. And it is electronically isolated from networks or other communication media that may be used by the organization that maintains the certification authority so as to prevent introduction of incorrect software or unauthorized access to information stored on the computer, including the private key. When a certificate is to be generated, the trusted administrator enters the room to access the computer, inputs information for the entity for whom the certificate is to be generated, and obtains the certificate, in machine-readable form, from the computer. Thus, a computer needs to be set aside essentially solely for use as a certification authority.

Generally, an entity that wishes to have a certificate issued will transmit a certificate issuance request to a trusted administrator by any of a number of methodologies, including, for example, Email, requests transferred over the World Wide Web, physical appearance before the trusted administrator, and the like. If the administrator approves a request, he or she saves identification information for the entity for which the certificate is to be generated on a machine-readable medium using the computer that he or she normally uses for his or her work. When the certificate is to be generated, the administrator takes the machine-readable medium from that computer to the computer that is used as the certification authority for use in generating the certificate or certificates that are to be generated during a certificate generation session. During the certificate generation session, the certification authority can read the identification information for the entities for which the certificates are to be generated, display the information to the administrator to permit him or her to make last-minute changes and verification of information as necessary, and generate the certificates. Typically, certificates are generated in a batch fashion, with the administrator engaging in certificate generation sessions periodically.

Setting aside a computer, separate and apart from the other computers maintained by an organization, as a certification authority, in a looked room to maintain the security for the computer, can be relatively expensive. In addition, batch generation of certificates during certificate generation sessions is relatively inconvenient, and can result in delay in issuance of a certificate.

SUMMARY OF THE INVENTION

The invention provides a new and improved system and method for providing a relatively inexpensive and more convenient certification authority.

In brief summary, the invention provides a certification authority for generating certificates in response to respective certification requests. The certification authority generally includes a computer that is bootable from a removable medium and a removable medium. The removable medium includes a machine readable medium having encoded thereon an operating system module configured to enable the computer to boot from the removable medium and a certificate generation module configured to, after the computer has been booted, control the computer to facilitate the generation of at least one certificate in response to an associated certificate request, the certification authority module being configured to provide that the computer not be remotely controlled during a certificate generation session.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
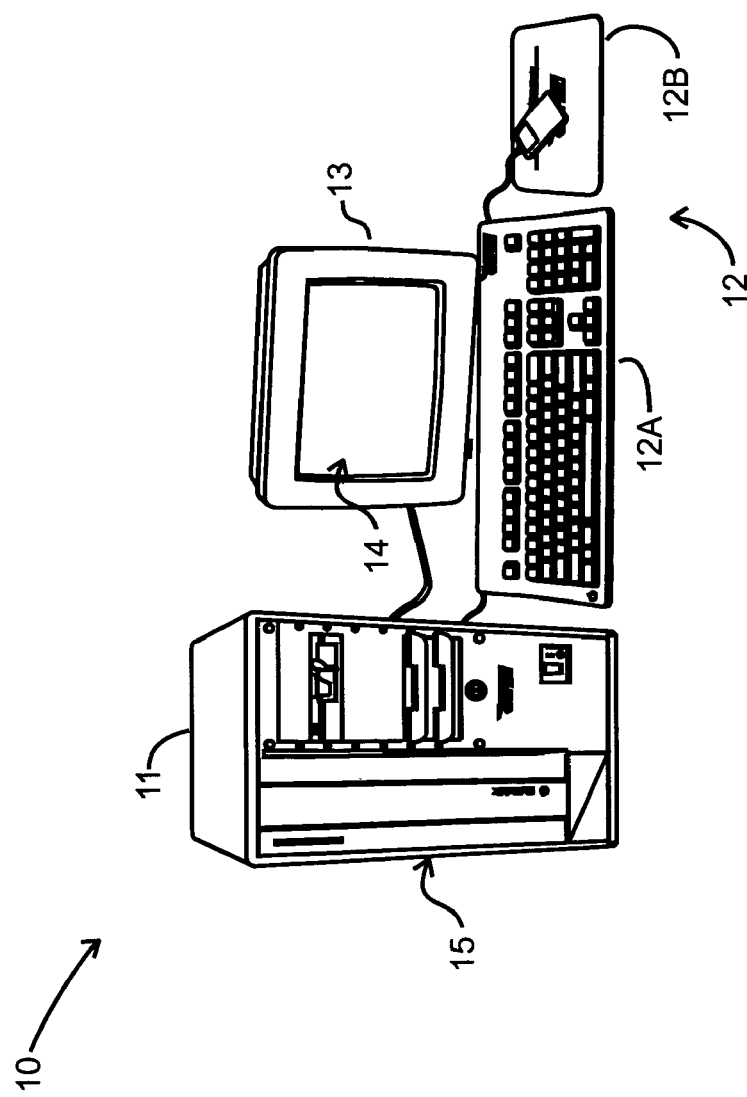
FIG. 1 depicts a digital computer system for use in connection with a certification authority, in connection with the invention.

FIG. 1 depicts an illustrative computer system 10 for use in a certification authority, constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media that may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 is provided to, respectively, display visual output information on a screen 14, which is generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

The invention provides a certification authority including the computer 10 and at least one removable machine-readable medium (not separately shown), such as a floppy disk, smart card or the like, which may be inserted into an appropriate device on the computer 10. The removable medium has encoded thereon several programs and modules that, when used by a trusted administrator with the computer 10 during a certificate generation session, serve to configure the computer 10 as a certification authority. The removable medium includes various operating system modules and certification authority modules. The operating system modules configure the removable medium as a bootable medium, so that, after the removable medium has been inserted into the computer's reading device and the computer 10 powered up or reset, the computer 10 will boot from the floppy disk. The computer's boot loader (not separately shown) is configured to initially completely replace any operating software that the computer may have resident thereon with the operating system from the removable medium. From the operating system, the trusted administrator who is using the computer 10 as the certification authority during the certificate generation session can make use of the certification authority modules, which will be described below, to generate the certificates.

Essentially, the invention provides that, since the removable medium can be used in connection with any computer for which the boot loader operates as described above, any such computer can be used as the certification authority, thus eliminating the necessity of providing a separate computer just to be used as a certification authority. In addition, if a trusted administrator maintains possession of the removable medium in a secure manner, such as in a safe, a locked drawer, or the like, the certification authority will be secure against access or tampering by a third party. Thus, the invention provides that no separate secure room need be provided to house the certification authority. Further, since the computer 10 used during the certification authority may constitute the computer that the administrator normally uses in his or her other work, certificate generation sessions are more convenient and the administrator may engage in such sessions more often than otherwise.

As noted above, in addition to the operating system modules as described above, the removable medium has stored thereon certification authority modules that serve to configure the computer 10 to a certification authority. In one embodiment, the certification authority modules comprise the following program modules:

(i) an authentication module;
(ii) a communication control module;
(iii) a certification request verification module;
(iv) a certification request display module;
(v) a certification request edit module;
(vi) a certification request approval module;
(vii) a digital signature module; and
(viii) an encrypted private key and a decryption module.

The authentication module controls the computer 10, preferably at the beginning of the certificate generation session, to require the administrator to authenticate him or herself to the certification authority. This may be accomplished by, for example, requiring the administrator to provide his or her identification, such as his or her name, and a password. After the administrator has authenticated him or herself, he or she can make use of facilities provided by the other modules to generate certificates during the certificate generation session.

The communication control module is provided to provide the computer 10 with at most limited communication capabilities. In one embodiment, the communication control module enables the computer 10 to, through the network connection 15, receive only certification requests and transmit signed certificates and messages indicating that a certification request has not been approved. The communication control module controls the computer to ignore or block any other type of attempt at communications with the computer. Specifically, the communication control module does not support services such as telnet, rlogin (remote login) or ftp (file transfer protocol) which might allow the computer 10 or any of its resources (such as memory or disks) to be controlled or accessed remotely over a network to which the computer 10 may be connected during the certificate generation session. This will ensure that, during the certificate generation session, particularly the certification authority's private key could not be accessed from a remote location over the network.

The certification request verification module is provided to enable the computer 10 to receive information received by the communication control module from the network, and checks the information to verify that the information is a certification request. Each certification request has a predetermined format, and the certification request verification module verifies that each, for each unit of information that is of sufficient size to be a certification request, the format of the information conforms to that for a certification request. In addition, the certification request format defines a plurality of fields, each having a certain type of data and allowed characters, and the certification request verification module verifies that information fields of each certification request contain the appropriate types of data and that they do not contain any characters that are not allowed for the respective fields.

The certification request display module is provided to enable the computer 10 to display certification requests that have been received by the communication control module from the network and verified by the certification request verification module on its screen 14 of video display device 13. The certification request display module also enables the computer 10 to, for example, list the certification requests to, in turn, allow the administrator to select one of the certification requests for display.

The certification request edit module is provided to enable the computer 10 to, in turn, allow the administrator to make changes to the information comprising the certification request before the certificate is generated. Changes may be for the purpose of, for example, correcting spelling errors, entering dates for which the generated certificate will be valid, and the like. The administrator may enter the changes through any of the operator input devices 12, including keyboard 12A and mouse 12B. As the administrator enters the changes, the certification request display module enables the computer 10 to display the changes on the screen 14 of video display device 13.

The certification request approval module is provided to enable the computer 10 to allow the administrator to approve or not approve a certification request. The administrator can indicate whether the certification request is to be approved by means of input provided through any of the operator input devices 12. For example, the certification request display module may enable the computer 10 to display "approved" and "not approved" pushbuttons on the screen 14 along with the certification request information, and, after the administrator has completed entering changes to the certification information, he or she may actuate one of the pushbuttons to, respectively, approve or not approve the certification request. If the administrator does not approve a certification request, the certification request approval module enables the computer 10 to generate a message so indicating for transmission by the communication control module to the entity that issued the request. On the other hand, if the administrator does approve a certification request, the certification request approval module enables the computer 10 to generate the certificate, making use of the digital signature module. The certificate includes information from the certification request, information regarding the certification authority, such as the identification of the certification authority, an identifier identifying the algorithm used by the digital signature module to generate the digital signature, and the certification authority's public key.

The digital signature module is provided to enable the computer 10, under control of the certification request approval module, to generate a digital signature using the certification authority's private key.

The encrypted private key and a decryption module are provided to enable the computer 10 to determine the certification authority's private key. The certification authority's private key is encrypted using an encryption key that is based on a one-way hash of the administrator's authenticating information. Accordingly, after the administrator has authenticated him or herself to the authentication module, the decryption module can decrypt the certification authority's private key using a decryption key that is also based on the one-way hash of the authenticating information provided by the administrator to the authentication module.

Figure 2:
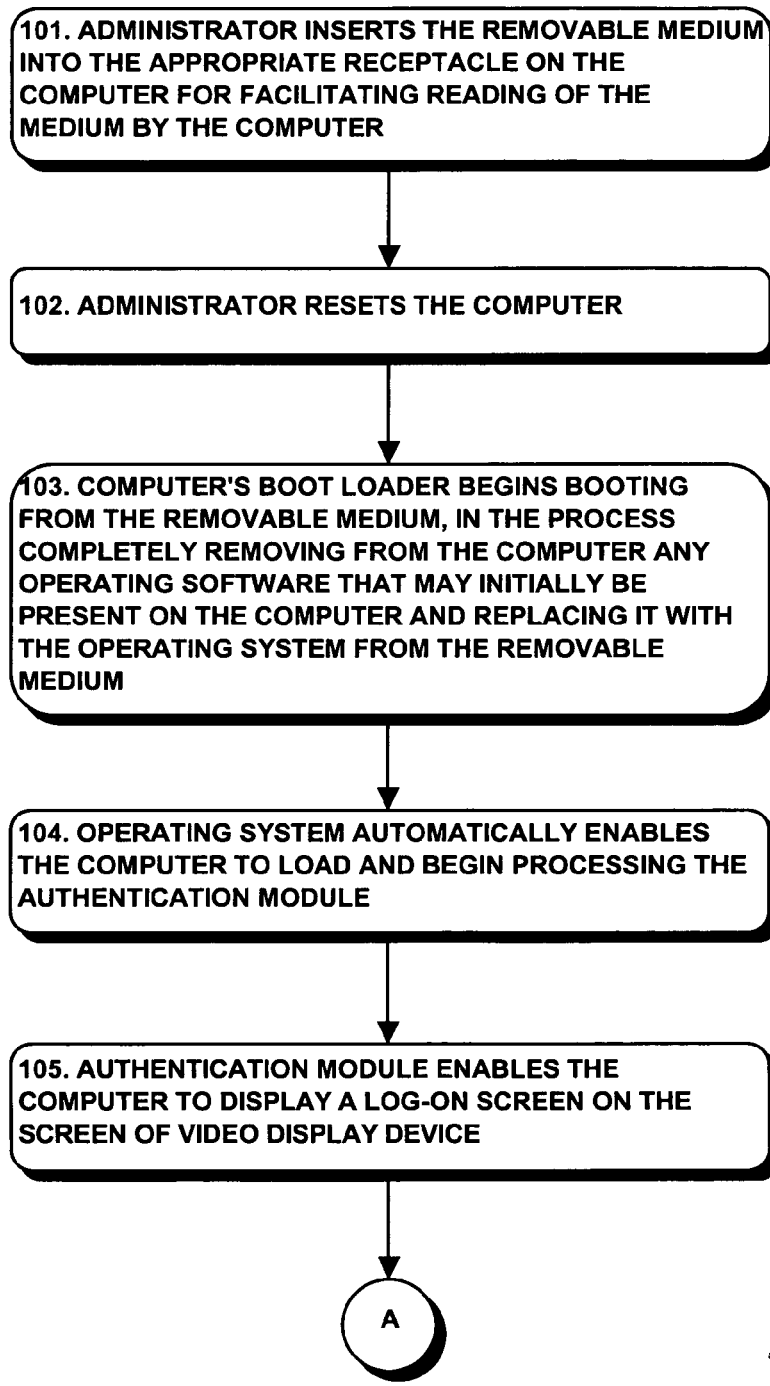
FIG. 2 is a flow chart depicting operations performed in connection with the digital computer system during a certificate generation session.
Figure 2B:
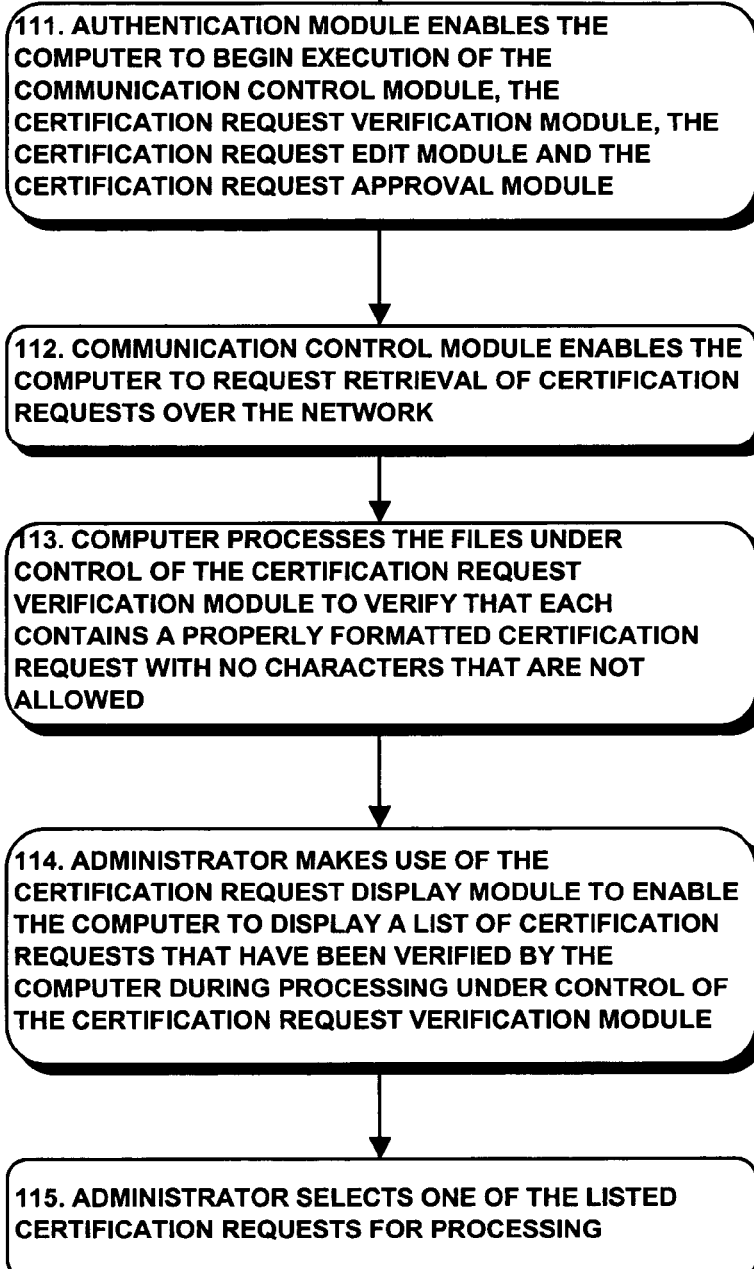

Operations performed in connection with a certificate generation session will be described in connection with the flow chart depicted in FIG. 2. To initiate a certificate generation session in connection with the computer 10, the administrator will initially insert the removable medium into the appropriate receptacle on the computer 10 for facilitating reading of the medium by the computer (step 101) and reset the computer (step 102). This may be accomplished in a number of ways, including actuation of a control button provided therefor on the computer, turning the computer's power off and on, or by any other conventional mechanism as will be appreciated by those skilled in the art.

After the computer has been reset, the computer's boot loader begins booting from the removable medium, in the process completely removing from the computer any operating software that may initially be present on the computer and replacing it with the operating system from the removable medium (step 103). After the operating system has been loaded it can automatically enable the computer 10 to load and begin processing the authentication module (step 104). Alternatively, the operating system as loaded from the removable medium can enable the computer 10 to display a command line, and the administrator can use the command line to provide input, using the operator input devices such as keyboard 12A and/or mouse 12B, to enable the computer to load and begin processing the authentication module. Other arrangements facilitating initiation of processing of the authentication module will be apparent to those skilled in the art.

After the computer 10 begins processing the authentication module, the authentication module enables the computer 10 to display a log-on screen or prompt line on the screen 14 of video 3 display device 13 (step 105). The administrator can then provide his or her identification indicia, which may include his or her name and/or other identifier, and authentication indicia, such as a password and the like, through the operator input devices, such as keyboard 12A and mouse 12B (step 106). Thereafter, the authentication module enables the computer to determine whether the authentication indicia conform to that provided earlier for the administrator' identification information (step 107). If the computer makes a negative determination in step 107, it may repeat steps 106 and 107 for a predetermined number of times to allow the administrator to provide the identification indicia and the correct authentication indicia (step 108). If the computer, while under control of the authentication module, determines that the administrator is unable to provide the correct authentication indicia that conforms to the identification indicia during the predetermined number of additional trials (step 109), the authentication module may exit, and not allow the administrator to continue the certificate generation session (step 110). In addition, the authentication module may enable the computer system 10 to erase critical portions of the removable medium, thereby ensuring that it cannot thereafter be used in connection with a computer to form a certification authority.

On the other hand, if the computer, while under control of the authentication module, makes a positive determination in step 107, or if it determines in step 109 that the administrator is able to provide the correct authentication indicia that conform to the identification indicia during at least one of the predetermined number of additional trials, the authentication module enables the computer to begin execution of the communication control module, the certification request verification module, the certification request edit module and the certification request approval module (step 111). Initially, the communication control module enables the computer to request retrieval of certification requests over the network through the network port 15 (step 112). The certification requests that are to be processed may be stored in, for example, individual files in a predetermined storage location in, for example, a server provided in the network. Alternatively, the communication control module may enable the computer to display a dialog box identifying the server and source location of the files containing the respective certification requests.

After the computer has received the files containing the certification requests under control of the communication control module, it (that is, the computer) processes the files under control of the certification request verification module to verify that each contains a properly formatted certification request with no characters that are not allowed (step 113). This may be done in a "batch" manner, in which the files are processed all at once. In that case, the certification request verification module can, for example, mark each file that contains a properly formatted certification request for later processing, and for others send notifications to the requesters indicating that the certification requests were rejected. Alternatively, it may be done in a mode in which it processes each file containing a certification request when the administrator selects the file for further processing.

Following step 113, the administrator makes use of the certification request display module to enable the computer 10 to display a list of certification requests that have been verified by the computer during processing under control of the certification request verification module (step 114) and selects one of the listed certification requests for processing (step 115). After the administrator has selected one of the listed certification requests in step 115, the certification request display module enables the computer to display information from the certification request file (step 116) so that the administrator can correct the information as necessary. If the administrator wishes to correct the information, he or she will enter update information using the keyboard 12A or mouse 12B, and the certification request edit module will enable the update information to be displayed and stored in the certification request file (step 117).

After the administrator is finished updating the certification request information and the information has been stored in the certification request file (reference step 117), the administrator can enable the certification request approval module to, in turn, enable the computer 10 to generate the certificate, if the certificate is to be approved, or notify the entity that requested the certificate that the certificate is to be rejected. In those operations, the administrator, using the keyboard 12A or mouse 12B, inputs indicia indicating either approval or rejection of the certificate (step 118). If the indicia indicate approval of the request, the certification request approval module is enabled to, in turn, enable the computer to generate the certificate (step 119). In that operation, the certification request approval module formats the certification request information from the certification request file, as updated by the administrator, as required for the certificate (step 120) and calls the digital signature module to generate a digital signature therefor from the information in the certificate and the private key (step 121). If the private key has not been previously decrypted, the digital signature module can also enable the decryption module to decrypt the encrypted private key. After the certificate has been generated, the certification request approval module enables the communication control module to transfer the generated certificate to the entity that requested it or to another publication location such as a directory service (step 122).

Returning to step 118, if the administrator inputs indicia indicating rejection of the certificate, the certification request approval module generates a rejection notice for transmission to the entity that requested the certificate, which may include information as to why the certificate was rejected (step 123). Thereafter, the certification request approval module enables the communication control module to transfer the generated rejection notice to the entity that requested the certificate (step 124).

Following step 122 or 124, the certification request display module can enable the computer to remove the just-processed certification request from the list displayed on the screen 14 (step 125). Thereafter, operations can return to step 115 to allow the administrator to select another certification request from the list, if any.

The above-described operations can be repeated for all of the certification requests in the list displayed on the screen 14 of video display device 13, or for any portion thereof as selected by the administrator during the certificate generation session. It will be appreciated that the administrator can terminate the certificate generation session at any time, in which case unprocessed certification requests can be maintained on the computer 10, stored on the removable medium, or the like, for processing during a subsequent certificate generation session, or retrieved again from its source location during a subsequent certificate generation session.

The invention provides a number of advantages. In particular, it provides a relatively inexpensive certification authority arrangement for an organization, which provides that many computers can operate as certification authorities, avoiding the necessity of taking extraordinary security measures for the computer to be used as the certification authority, such as isolating the computer from the organization's network and maintaining it in a secure locked room. The invention provides that (i) security of the certification authority be maintained by physical possession of the removable medium which includes all of the program modules to be used by the computer in connection with the certification authority, and (ii) electronic security be maintained by providing very limited communication capabilities for the computer, and specifically excludes any capability that would allow remote control of resources of the computer being used as the certification authority.

Since the invention can be used with any computer whose boot loader is configured to initially completely replace any operating software that the computer may have resident thereon with the operating system from the removable medium, the invention provides for extensive flexibility for the certification authority.

It will be appreciated that a number of modifications may be made to the arrangement as described above. For example, although the arrangement has been described as including a communication control module for controlling limited communications over a network, it will be appreciated that an arrangement may be provided that does not include a communication control module. In that case, the administrator may download the certification request files to a mass storage subsystem on the computer, or on the removable medium, prior to the certificate generation session, and the certification request files may be retrieved therefrom during the session. In addition, the issued certificates or rejections can be buffered on the hard disk during the session, and transmitted after the session has ended.

The computer that is used as the certification authority can be any kind of computer, including, for example, any personal computer, workstation, laptop, palm-top or the like. The computer must be dedicated to the certification authority function while it is being used as a certification authority during a certificate generation session, but it can be used for other operations at other times. In addition, although the computer has been described as providing a GUI for the operator, it will be appreciated that the computer may instead or in addition provide a command line interface.

It may be advantageous to have some portion of the arrangement that is described above as being stored on the removable medium, stored on a separate medium. For example, one or more of the digital signature module, encrypted private key and decryption module can be stored on a Smart Card or iButton, and a separate authentication may be required for that. Furthermore, the two (that is, the removable medium storing the other modules, and the Smart Card or iButton storing the digital signature module, encrypted private key and/or the decryption module) may be linked, so that the one may not be used without a specific other. In that case, even if one of them is lost or the security otherwise compromised, they cannot be used in combination with another SmartCard/iButton or removable medium, respectively. The Smart Card or iButton can be provided with disabling software so that, if a predetermined number of authentication attempts are unsuccessful, the device will be disabled.

Instead of using a removable medium, some or a significant portion of the modules can be stored on a programmable read-only memory ("PROM") comprising part of the computer, which may form part of, for example, the boot loader or other component. In that case, one or more of the digital signature module, encrypted private key and decryption module can be stored on a Smart Card or iButton, and a separate authentication may be required for that, as described above.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided to the system over a network or other mechanism for transferring information in a conventional manner. In addition, it will be appreciated that the system may be operated and/or otherwise controlled by means of information provided by an operator using operator input elements (not shown) that may be connected directly to the system or that may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A certification authority for generating certificates in response to respective certification requests, the certification authority comprising:
    a general-purpose computer that is bootable; and
    a removable medium comprising a machine readable medium having encoded thereon:
        an operating system module configured to enable the computer to boot an operating system from the removable medium; and
        a certificate generation module configured to, after the computer has been booted, initiate a certificate generation session and control the computer to facilitate the generation of at least one certificate, as the certification authority, in response to an associated certification request, wherein the computer, upon booting from the removable medium, is dedicated as the certification authority during the certificate generation session and executes only operations related to the certificate generation session, and
    wherein remote control of the computer is prevented while the computer is dedicated as the certification authority.

2. A certification authority as defined in claim 1 in which said certification authority operates under control of an operator, the certificate generation module enabling the computer to display certification request information associated with the certification request to the operator and receive operator input information from an operator, the certificate generation module enabling the computer to use the input information from the operator in generating the at least one certificate.

3. A certification authority as defined in claim 2 in which the operator input information includes operator authentication information, the certificate generation module including an authentication module configured to enable the computer to receive the operator authentication information and verify that the operator is authorized to control the certification authority.

4. A certification authority as defined in claim 3 in which the certificate includes an digital signature comprising a signature that is generated using private encryption key, the certificate generation module including
    an encrypted private key;
    a decryption module configured to enable the computer to use the operator authentication information to decrypt the encrypted private key thereby to obtain a private key; and
    a digital signature module configured to enable the computer to generate a digital signature from information in the at least one certificate using the private key.

5. A certification authority as defined in claim 2 in which the certificate generation module further includes:
    a certification request information display module configured to enable the computer to display certification request information to the operator; and
    a certification request edit module configured to enable the computer to receive certification request modification information from the operator and update information in the certification request in response thereto.

6. A certification authority as defined in claim 2 in which the certificate generation module further includes a certification request approval module configured to enable the computer to receive operator input information comprising a certification certificate request approval and generate the certificate request in response thereto.

7. A certification authority as defined in claim 1 in which the certificate generation module further includes a certification request verification module configured to enable said computer to determine whether the information in the at least one certification request is in a predetermined format.

8. A certification authority as defined in claim 1 in which the computer is connected to retrieve certification requests from a remote storage location, the certificate generation module further including a communication control module configured to enable the computer to retrieve certification requests from the remote storage location.

9. A computer program product for use in connection with a general purpose computer to form a certification authority for generating certificates in response to respective certification requests, the computer being bootable, the computer program product comprising a removable medium in the form of a machine readable medium having encoded thereon:
   an operating system module configured to enable the computer to boot an operating system from the removable medium; and
   a certificate generation module configured to, after the computer has been booted, initiate a certificate generation session and control the computer to facilitate the generation of at least one certificate, as the certification authority, in response to an associated certification request,
wherein the computer, upon booting from the removable medium, is dedicated as the certification authority during the certificate generation session and executes only operations related to the certificate generation session, and
   wherein remote control of the computer is prevented while the computer is dedicated as the certification authority.

10. A computer program product as defined in claim 9 in which said certification authority operates under control of an operator, the certificate generation module enabling the computer to display certification request information associated with the certification request to the operator and receive operator input information from an operator, the certificate generation module enabling the computer to use the input information from the operator in generating the at least one certificate.

11. A computer program product as defined in claim 10 in which the operator input information includes operator authentication information, the certificate generation module including an authentication module configured to enable the computer to receive the operator authentication information and verify that the operator is authorized to control the certification authority.

12. A computer program product as defined in claim 11 in which the certificate includes a signature comprising a signature that is encrypted using a private encryption key, the certificate generation module including
   an encrypted private key;
   a decryption module configured to enable the computer to use the operator authentication information to decrypt the encrypted private key thereby to obtain a private key; and
   a digital signature module configured to enable the computer to generate a digital signature from information in the at least one certificate and encrypt the digital signature using the private key.

13. A computer program product as defined in claim 10 in which the certificate generation module further enables the operator to receive operator input information relating to information in the certification request, the certificate generation module further including:
   a certification request information display module configured to enable the computer to display certification information to the operator; and
   a certification request edit module configured to enable the computer to receive certification request modification information from the operator and update information in the certification request in response thereto.

14. A computer program product as defined in claim 10 in which the certificate generation module further includes a certification request approval module configured to enable the computer to receive operator input information comprising a certification request approval and generate the certificate in response thereto.

15. A computer program product as defined in claim 9 in which the certificate generation module further includes a certification request verification module configured to enable said computer to determine whether the information in the at least one certification request is in a predetermined format.

16. A computer program product as defined in claim 9 in which the computer is connected to retrieve certification requests from a remote storage location, the certificate generation module further including a communication control module configured to enable the computer to retrieve certification requests from the remote storage location.

* * * * *